Figure 1:
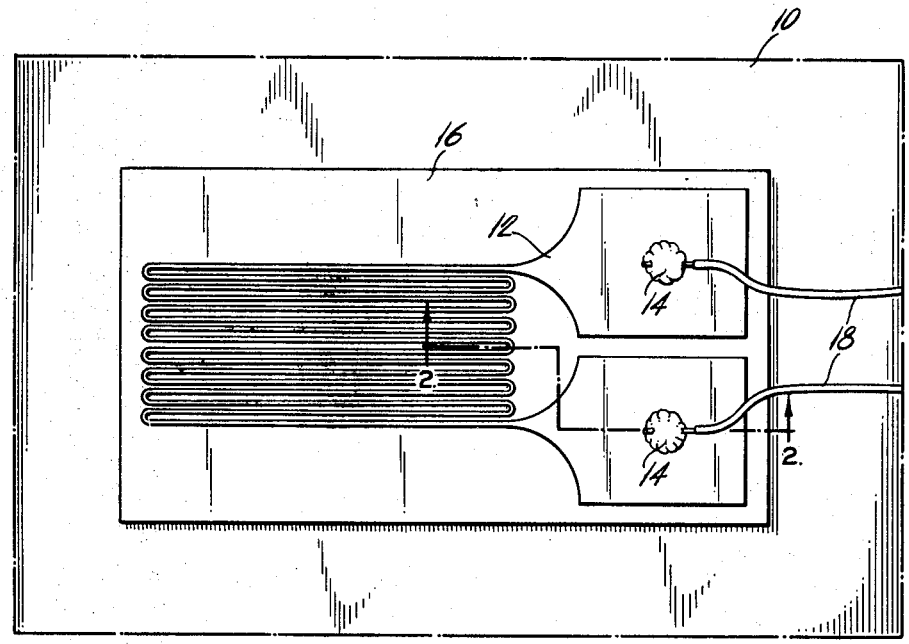

United States Patent

[11] 3,609,624

[72] Inventor Bella Nagy
  Phoenixville, Pa.
[21] Appl. No. 804,357
[22] Filed Feb. 20, 1969
[45] Patented Sept. 28, 1971
[73] Assignee Vishay Intertechnology, Inc.
  Malvern, Pa.
  Continuation of application Ser. No.
  613,583, Feb. 2, 1967, now abandoned.

[54] STRAIN GAGE AND METHOD OF BONDING THE GAGE TO A MEMBER UNDER TEST
  8 Claims, 2 Drawing Figs.
[52] U.S. Cl. ..................................................... 338/2
[51] Int. Cl. ..................................................... G01l 1/22
[50] Field of Search ............................................ 338/25

[56] References Cited
  UNITED STATES PATENTS
  3,274,528 9/1966 Berman ........................ 338/2

OTHER REFERENCES

C. C. Perry and H. R. Lissner, The Strain Gage Primer, 2nd ed. McGraw Hill Book Co. N.Y., 1955 pp. 20, 21,22,23,33,34,35,36,41,42

H. Lee and K. Neville, Epoxy Resins, McGraw Hill Book Co. N.Y. 1957 pp. 18,19,20,214,215,216,225,226,227

Primary Examiner—Reuben Epstein
Attorney—Dan R. Sadler

ABSTRACT: A strain gage of the electrical resistance type is disclosed herein which has improved adhesive means to attaching the gage to a member under test. The adhesive is applied to the gage at the time of manufacture and includes a thermosetting adhesive composition which is substantially nontacky at room temperature, and upon heating to a first elevated temperature wets the surface of the test piece in contact therewith and when heated to a second higher temperature, is converted to the infusible, insoluble state.

PATENTED SEP 28 1971

3,609,624

INVENTOR:
BELA NAGY
BY Howson & Howson
ATTYS.

STRAIN GAGE AND METHOD OF BONDING THE GAGE TO A MEMBER UNDER TEST

CROSS-REFERENCES TO RELATED APPLICATION

The following is a continuation of patent application for a strain gage, Ser. No. 613,583, filed Feb. 2, 1967, and now abandoned, on behalf of Bela Nagy.

BACKGROUND OF THE INVENTION

1. Field of the Invention

This invention relates to a strain gage of an electrical resistance type and more particularly to a strain gage including improvements in means for attaching the gage to a member under test.

2. Description of the Prior Art

Early strain gages of the electrical resistance type were made by embedding a fine strain-sensitive wire in cast thermoplastic resin coupons. These gages were bulky and did not allow the strain-sensitive wire to be in intimate contact with the body being tested. Subsequently, strain gages were formed by cementing a fine wire between two pieces of paper. The paper served as a carrier for ease of handling the wire and insulated the wire from the metal surface to which it was to be adhered. Such gages were bonded to the test body by a suitable liquid adhesive applied at the time of installing the gage. In order to obtain more complete and rapid evaporation of solvent where a solvent base adhesive was used, the employment of special thin base paper was suggested.

More recently there has been devised a strain gage in which the strain-sensitive element is composed of metallic foil. The metal foil is slotted alternately from each end to form a continuous grid or series of elongated loops. The foil is not mounted in paper, but is adhered to a thin film of lacquer having the desired mechanical and electrical properties. Adhesion between the lacquer film and the test body has been obtained by means of a suitable liquid adhesive applied at the time of installation.

If precise measurement of surface strains is desired, the sensitive wire or metallic foil must have these strains transmitted to it by the bonding adhesive. This can be accomplished only by a sound bonding job.

As stated above, in adhering a strain gage to the test member it has been the practice to apply a suitable liquid adhesive to the gage and/or test body at the time of installation, clamp the gage in place and convert the adhesive to the solid state by evaporation of adhesive solvent and/or by polymerization or condensation. Evaporation of adhesive solvent prior to clamping the gage to the test body, but prior to the time the adhesive sets, has also been attempted. Unfortunately, neither procedure has proved to be entirely satisfactory for adhering the gage to the test body to obtain optimum transmission of strain from the test member to the strain-sensitive grid. When the gage is clamped to the test body prior to evaporation of solvent, void spaces may form between the gage grid and the test member which prevent uniform transmission of strain to the gage. Where the solvent has been removed prior to clamping the gage to the surface of the test body, the adhesive being relatively nonflowable, did not properly wet the surface to which the gage was to be adhered. In such case, the adhesion of the gage to the test member was poor, resulting either in complete separation of the gage from the test member during use, or in nonuniform strain transmission to the gage. In addition, application of the adhesive at the site of the gage installation frequently is inconvenient and, in some gage installations, the solvent poses a fire hazard.

Epoxy resins, which are solvent-free liquids at room temperature, have also been used as strain gage adhesives. Such resins are converted to the infusible, insoluble state by the action of certain hardeners. Since the "pot life" of these epoxy resins, i.e. the usable time after introduction of hardener, is limited, the components of the adhesive must be weighed and combined just prior to strain gage installation. Frequently this must be done at the site of the installation which, in the case of many installations is most inconvenient. In addition, mixing of the components must be done in such manner as to avoid introduction of a substantial number of air bubbles to the mixture, otherwise, the adhesive layer between the gage and test piece will be discontinuous, resulting in poor, nonuniform strain transmission to the gage.

Regardless of the type of liquid adhesive heretofore employed in making strain gage installations, the quality of such installations has depended upon the skill and experience of and the care employed by the person making the installations. Furthermore, as noted above, considerable inconvenience has been encountered where the adhesive must be prepared, as well as applied, at the installation site.

It is an object of this invention to provide an improved electrical strain gage in which an adhesive of certain specified properties for adhering the gage to a test member is applied during gage manufacture, whereby the above-described difficulties of gage installation are overcome.

A further object is a strain gage which can be installed quickly and easily, even by relatively inexperienced workers.

Another object is to provide a strain gage capable of making improved installations to obtain consistently accurate strain determinations.

Still another object is to provide strain gage suited for high temperature operation.

These and other objects, advantages, and features of novelty will be evident hereinafter.

Figure 2:
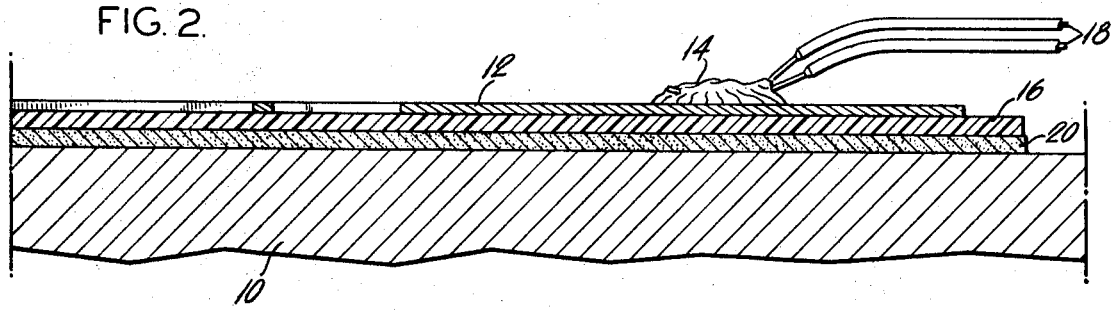

In the drawing which illustrates preferred embodiments of the invention:

FIG. 1 is a perspective view of a strain gage unit embodying the present invention adhered to a test body, and with the conductor leads attached; and FIG. 2 is an enlarged cross-sectional view of that portion of the strain gage cut by the plane 2-2 of FIG. 1 as it appears attached to the test body.

Referring to the drawing in which the same reference characters refer to the same or similar elements, 10 is a portion of a member to be stressed which, for example, may be a structural element such as the web or flange of a beam in which it is desired to measure the strains or stresses under varying load conditions. The strain gage unit adhered to the test member 10 comprises a gage grid 12 of thin metal foil or leaf with conductor terminal tabs 14, and a backing carrier 16 of very thin, flexible heat-resistant electrically nonconductive material, such as a film of a thermosetting resin of the epoxy, phenolic, or like types. Terminal tabs 14 have attached thereto conductor wire leads 18 which are connected to a suitable circuit for measuring small changes in resistance, not shown.

The conductor wire leads 18 usually are connected to the terminal tabs 14 after the strain gage has been cemented to the test body. Connection of the leads 18 to the terminal tabs 14 can be effected by soldering, welding or like operations.

The strain gage of this invention is provided with a layer 20 of a thermosetting adhesive or cement, the nature of which is more fully described hereinafter. The adhesive layer 20 preferably is coextensive with the backing carrier 16 and provides the adhesion between backing carrier 16 and text member 10, upon curing.

The dimensions of the various elements forming the strain gage can be varied depending upon the application for which the gage is designed. For most applications the gage grid will have a thickness on the order of 0.00010 inch to 0.00025 inch, and the grid will vary in length between about 0.05 inch and about 0.3 inch. For a metal foil grid having the above dimensions, the thickness of the backing carrier ordinarily will range from about 0.00005 inch to about 0.001 inch, and the adhesive layer will vary in thickness from about 0.001 inch to about 0.002 inch.

The adhesive layer 20 for bonding the strain gage to the member under test comprises a thermosetting resin having certain specific properties. At room temperature the adhesive, which is solvent-free, is in the form of a substantially nontacky film. Thus, the strain gages of this invention can be handled and packaged without special precautions. Upon heating the adhesive to an elevated temperature it becomes flowable to such degree as to wet the surface of the test member to which it is applied. By so wetting the surface of the test member, upon curing of the resin there is formed between the gage and the test member a strong bond layer which is coextensive with the gage backing carrier for uniform transmission of strain from the test member to the gage.

Upon further heating of the adhesive layer it is converted to the infusible, insoluble state, whereby the gage is firmly bonded to the test member.

A particularly effective adhesive composition for use in the strain gages of this invention comprises a thermosetting resin or a mixture of different thermosetting resins which becomes fluid in the range between about 120° and 200° F., and a catalyst for converting the resin or resin mixture into the infusible, insoluble state. The catalyst should not be effective to cure the resin except at temperatures which are above the temperature at which the adhesive becomes sufficiently fluid to wet the test member. For most applications, a suitable catalyst is one which becomes active to cure the adhesive at a temperature of at least 20° F., and preferably at least 50° F., above the temperature at which the adhesive composition becomes sufficiently fluid to wet the test member.

Depending upon the particular resin-catalyst system, a convenient manner of providing an adhesive having the above-described properties, is to employ a catalyst which is combined either physically or chemically with another material, and which upon being heated to elevated temperatures above the temperature at which the adhesive becomes fluid, decomposes to make the catalyst available in its active form to effect a cure of the adhesive.

Thermosetting resins which have been found to be particularly satisfactory for use in the adhesive layer 20 of the strain gages of this invention are various types of epoxy resins. The strain gages of this invention are described hereinafter particularly with reference to adhesive compositions comprising epoxy resins, which are preferred.

In selecting a suitable resin, consideration should be given to the particular conditions to which the strain gage will be subjected after installation. If the gage will not be subjected to elevated temperatures, or only to moderately elevated temperatures not exceeding about 200° F., bisphenol-A based, high molecular weight epoxy resins which are solid, and substantially nontacky at room temperature prior to curing may be used. Such resins are commercially available in a variety of molecular weights and melting points which increase with molecular weight. Since they contain but two, relatively widely spaced reactive groups, they do not provide the high degree of cross-linking necessary for thermal stability at high temperatures. However, they provide an excellent bond where the gage after installation will be subjected to room temperature or slightly elevated temperatures.

If the gage will be subjected to higher temperatures, then the resin should be one which is resistant to thermal degradation and evidences little or no creep at elevated temperatures up to about 500° F. Suitable resins of this type are epoxylated orthocresol formaldehyde, epoxylated resorcinol formaldehyde and similar epoxy resins containing more than two reactive groups per molecule. These resins are capable of a high degree of cross-linking and moreover, due to the presence of a high concentration of thermally stable aromatic rings within the molecule, are thermally stable at temperatures up to about 500° F.

Unfortunately, these thermally stable epoxy resins are not available in a series of increasing melting points, and generally either have a melting point which is so low, or so high as to overlap with the curing temperature, thereby interfering with a proper melting of the resins prior to cure.

A particularly useful thermally stable epoxy resin for use in the adhesive of the strain gages of this invention is an epoxylated cresol-formaldehyde resin. Such a resin may be obtained by reacting epichlorohydrin with an orthocresol-formaldehyde novolak. Such a polyepoxy resin may have a molecular weight of from about 500 to about 1,500, and a functionality of from about 2 to about 6. A particularly preferred resin of this type for use in combination with another epoxy resin in forming the adhesive layer 20, described more fully hereinafter, is one having a functionality of about 6, a molecular weight of about 1,270 and a melting point of about 210° F., sold by Ciba Corporation, under the designation ECN 1299.

In order to provide an epoxy adhesive having high-temperature properties, yet is sufficiently flowable before cure to wet the surface of the test member, a relatively low melting epoxy resin may be combined with the higher melting, temperature resistant resin. For example, such an adhesive composition may be obtained by mixing the above-described relatively high melting point epoxylated cresol-formaldehyde resin with a relatively low melting point epoxylated resorcinol-formaldehyde resin. A suitable resin of the latter type is QX-3476 of The Dow Chemical Company, which has a melting point of about 120° F. and a functionality of 1.

A particularly preferred adhesive formulation for the adhesive layer 20 of the strain gage of this invention comprises 100 parts by weight of such a high melting point epoxylated cresol-formaldehyde resin, and from about 25 to 100 parts of such a low melting point epoxylated resorcinol-formaldehyde resin.

As stated above, in order to permit the adhesive composition to become sufficiently fluid to wet the test member prior to curing, it is preferable to employ in the composition a catalyst which becomes activated at a temperature somewhat above, e.g., at least 20° F. above the temperature at which the composition reaches such fluidity. A particularly useful catalyst for the above-described epoxy resin system is a boron trifluoride-monethanolamine complex which decomposes at about 210° F. to release boron trifluoride which is the active catalytic material for curing the resins.

The adhesive composition layer 20 preferably is applied to the gage in the form of a solution in an organic solvent. The solvent should be a volatile one which can be removed at temperature below the melting point of the resin with which it is employed. The selection of a suitable solvent will present no problem to a skilled resin chemist. Particularly useful solvents for epoxy resin adhesives of the above-described type are acetone, methyl ethyl ketone, toluene and xylene. The amount of solvent employed will depend upon the viscosity desired. Epoxy resin solutions containing from about 30 to about 60 percent, by weight of resin solids have been found to be most satisfactory for forming the adhesive layer 20.

The solvent solution of adhesive may be applied to the strain gages by any suitable type of equipment such as doctor blade units, roller coating units, spray devices or the like. Following application of adhesive, the gages should be subjected to conditions to remove solvent. The conditions should be selected so as to avoid causing any partial curing of the resin.

In making the installation shown in the drawings, the gage is simply clamped in place and heated to elevated temperatures. The rate of heating should be such as to permit the adhesive to become sufficiently fluid to wet the test member 10 prior to being converted to the infusible, insoluble stage. Heating conditions will, of course, depend upon the composition of the adhesive. The gage should be heated to a temperature at which the adhesive becomes fluid, which temperature should be maintained for a sufficient time to insure proper wetting of test member by the adhesive. The temperature is then raised to that at which the adhesive cures. With the specific mixture of epoxy resins described above, the composition becomes sufficiently fluid at a temperature of about 160° to about 170° F., and cure can be effected at a temperature of from about 210° to about 400° F.

After the gage has been cemented to the test member conductor leads 18 are connected to the terminal leads 14, as for example by soldering.

Where the gage after installation will be subjected to elevated temperature, the backing sheet preferably should be capable of withstanding temperatures up to about 500° F. without deterioration.

It is thus seen that the invention provides an improved gage, an improved gage installation and an improved method of making a gage installation in which the objects of the invention are fully attained. The installation can be made by relatively unskilled workers.

The following example is illustrative of the preparation of an adhesive composition for use in the strain gages of this invention.

A mixture was formed by dissolving 100 parts, by weight, of an epoxylated cresol-formaldehyde resin having a molecular weight of about 1270, a melting point of about 210° F., and a functionality of about 6 (Ciba ECN 1299, Ciba Corporation) and 50 parts, by weight, of an epoxylated resorcinol-formaldehyde resin having a melting point of about 120° F. and a functionality of about 1 (QX-3476, The Dow Chemical Company), in 210 parts of acetone. To this mixture was added 7.5 parts, by weight, of a complex of boron trifluoride and monoethanolamine ($BF_3 \cdot MEA$). The solution was stirred until all of the catalyst was dissolved. The resin solution had a viscosity of 4-6 cps. at room temperature.

The above resin solution was applied to the carrier backing 16 of a strain gage as shown in the attached drawing and described hereinabove. Solvent removal was obtained by heating the gage at 120° to 130° F. for from 30 to 40 minutes. The resulting resin film was dry, and nontacky and had a thickness of 0.001 inch. The gage is ready for packaging, and may be installed by merely pressing the gage to the test member with the adhesive layer in contact therewith, and heating the assembly to cause the adhesive to wet the test member and to cure the resin.

While certain embodiments have been disclosed by way of illustration, it is to be understood that there may be various other embodiments and modifications within the general scope of the invention.

I claim:

1. In a strain gage of the electrical resistance type adapted to be attached to a member under test comprising an electrically conductive filament resistively responsive to strain applied to it, adhered to a heat resistant carrier backing, the improvement of which comprises:
    a film of thermosetting adhesive composition on the exposed surface of said backing for bonding it to a test member, said adhesive composition comprising an epoxy resin which is substantially nontacky at room temperature, but upon heating to a temperature in the range between about 120° F. and 200° F. becomes flowable to wet the surface of the test piece in contact therewith; and
    a catalyst which is effective to convert said resin to an infusible, insoluble state at a temperature of at least 20° F. above the temperature at which said composition becomes fluid, said adhesive composition comprises a mixture of 100 parts by weight of an epoxylated cresol-formaldehyde resin and from about 25 to 100 parts of an epoxylated resorcinol formaldehyde resin.

2. The strain gage as defined in claim 1 in which said adhesive composition contains from about four to about 10 parts by weight of boron trifluoride-monethanolamine complex per 100 parts of epoxylated cresol-formaldehyde resin.

3. In a strain gage of the electrical resistance type adapted to be attached to a member under test comprising an electrically conductive filament resistively responsive to strain applied thereto, the improvement of which is comprised of:
    a film of a thermosetting adhesive composition on the exposed surface of said filament for bonding the filament to the member under test;
    said film being comprised of a mixture of a first epoxy resin having a melting point at a first elevated temperature and a second epoxy resin having a melting point at a second elevated temperature relatively higher than the melting point of said first epoxy resin and being substantially nontacky and solvent-free at room temperature and a catalyst which is adapted to activate only at said second elevated temperature and convert said film into an infusible, insoluble state whereby said film upon being heated to the first elevated temperature, the low melting point epoxy resin becomes flowable to wet the surface of the member under test in contact therewith and upon being heated to the second elevated temperature the epoxy resins polymerize and become infusible, insoluble and bondable to said member.

4. The strain gage as defined in claim 3 in which said film of thermosetting adhesive composition is adapted to become fluid at a temperature in a range between 120° F. and 200° F. to wet the test member to which said gage is to be applied.

5. The strain gage as defined in claim 3 in which said relatively high melting point epoxy resin polymerizes at a temperature approximately 20° F. above the temperature at which the said relatively low melting point epoxy resin becomes fluid.

6. The method of adhering a strain gage of the electrical resistance type of a member under test which includes an electrically conductive filament resistively responsive to strain applied thereto comprising the steps of:
    disposing a film of thermosetting adhesive composition on the exposed surface of said filament for bonding the filament to the member under test, said film being comprised of a mixture of a relatively high melting point epoxy resin, a relatively low melting point epoxy resin and a catalyst material;
    heating said film to a first elevated temperature whereby the low melting point epoxy resin in said mixture becomes flowable to wet the surface of the member under test in contact therewith; and
    heating said film to a second elevated temperature whereby the relatively high melting point epoxy resin is caused to polymerize by the activation of said catalyst and become infusibly, insolubly bonded to said member.

7. The method as defined in claim 6 in which said film is heated to the second elevated temperature at a range between 120° F. and 200° F.

8. The method as defined in claim 6 wherein said second elevated temperature is at a temperature of approximately 20° F. above the temperature of the first elevated temperature.

Dedication 3,609,624.—*Bella Nagy*, Phoenixville, Pa. STRAIN GAGE AND METHOD OF BONDING THE GAGE TO A MEMBER UNDER TEST. Patent dated Sept. 28, 1971. Dedication filed July 8, 1982, by the assignee, *Vishay Intertechnology, Inc.*

Hereby dedicates to the Public the remaining term of said patent with all issued claims.

[*Official Gazette Aug. 31, 1982.*]